United States Patent Office 3,707,407
Patented Dec. 26, 1972

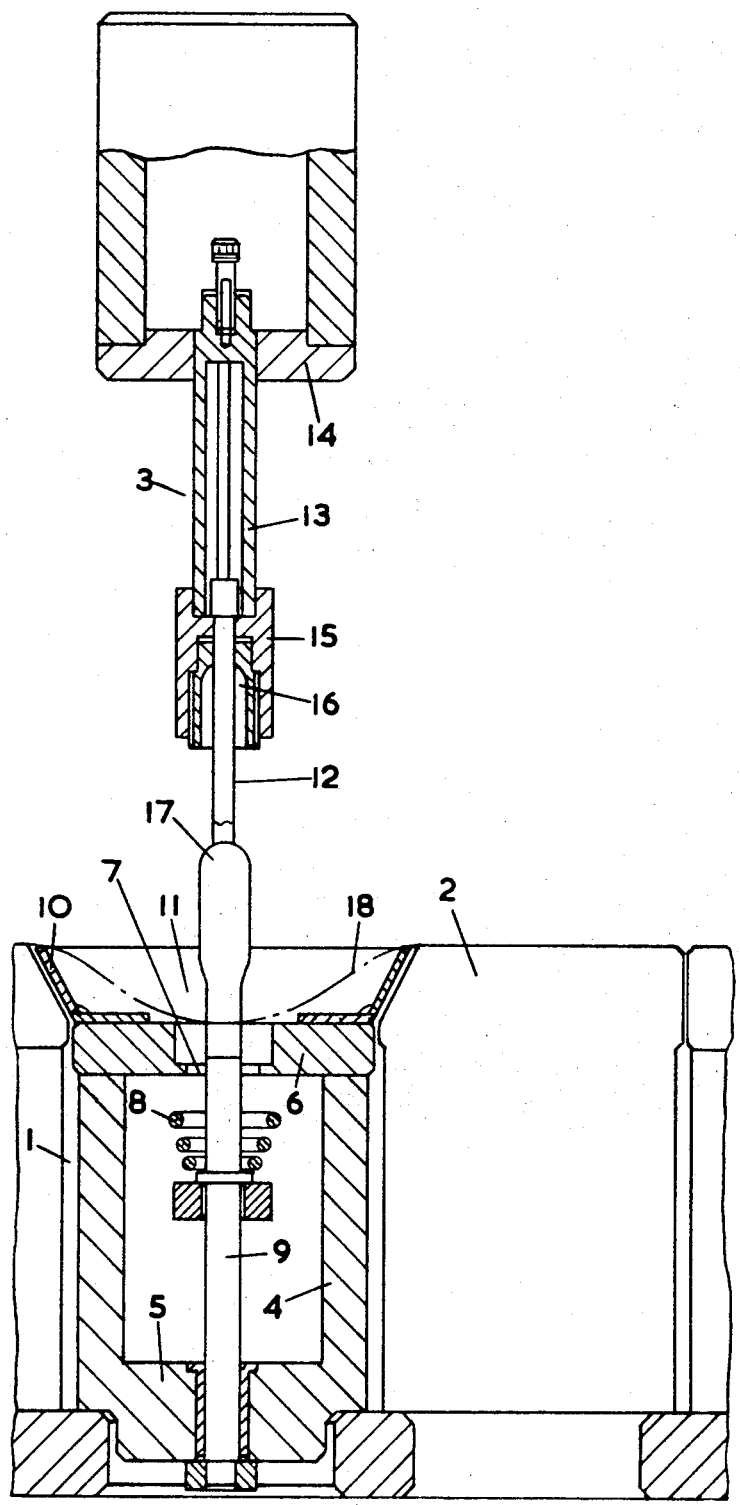

3,707,407
MULTI-STAGE FORMING OPERATIONS
Erich R. Spielmann, Loughton, England, assignor to
The British Oxygen Company Limited
Continuation of application Ser. No. 649,226, June 27,
1967. This application Apr. 21, 1970, Ser. No. 28,279
Claims priority, application Great Britain, June 28, 1966,
28,893/66
Int. Cl. C21d 7/14
U.S. Cl. 148—12                                    4 Claims

ABSTRACT OF THE DISCLOSURE

A high speed multi-stage forming operation with inter-stage heat annealing which includes the steps of immersing, at least part of a formed workpiece in coolant liquid, heating said part while immersed until it reaches the annealing temperature, and moving the workpiece while still in the coolant liquid towards the next forming stage with the heated part remaining immersed in the liquid for a time sufficient to cool the heated part below the temperature at which significant oxidation can occur.

---

This is a continuation of application Ser. No. 649,226, filed June 27, 1967, now abandoned.

This invention relates to multi-stage forming operations and more particularly to operations involving inter-stage heat treatment.

In producing shaped articles by successive forming operations, as for example, the manufacture of deep drawn containers such as small compressed gas bulbs from sheet or strip metal, the progressive deformation results in work hardening. This necessitates the introduction into the process of one or more heat treatment operations.

Forming machines are known in which the successive deforming operations are combined in a single machine with automatic transfer from one stage to the next. Further, high speed automatic machines are known in which each deforming and transfer cycle occupies a time interval as small as one second and less.

The introduction into such a high-speed machine of one or more heat treatment stages has, however, created difficulties because it was found impossible effectively to heat treat the work within the limits set by the operating speed of the machine. For this reason the work had to be removed from the machine for heat treating externally of the machine and independent of its time cycle.

Attempts to integrate the heat treatment cycle with the deforming cycle when the heating was carried out in air failed because of oxidation of the metal and the relatively slow rate of cooling in air.

To overcome this problem the proposal has been made to provide a heat treatment station in which the work could be submerged in liquid in manner well known in the art of surface hardening.

Whilst such proposal may prove successful on a relatively slow cycle of operation, for example in excess of two seconds, for high speed operation of the order of one second and less, the time available for cooling has proved inadequate.

The cycle of movement of the workpiece in the previously proposed heat treatment stage comprises:

Phase 1—introduction of the workpiece into the heat unit;

Phase 2—a dwell period during part of which heat is applied and during the remainder of which the workpiece is cooled by ambient liquid;

Phase 3—withdrawal of the workpiece from the liquid to a transfer level;

Phase 4—movement along the transfer level to the next work station.

The dwell period (Phase 2) can in practice occupy not more than about one-third of the cycle time. It has, however, been shown that this period whilst sufficient to heat the work piece to the required temperature, is insufficient to permit adequate cooling whilst the workpiece is submerged if a time cycle of the order of one second or less has to be achieved.

Uniform heating can be achieved in approximately 0.25 second using induction heating but, if only one-third of a second is available while the workpiece is submerged, there remains less than 0.1 second for cooling before Phase 3 comes into operation. This is quite inadequate to achieve the necessary cooling and an object of this invention is to provide for more protracted contact with the cooling liquid without increase in total cycle time.

According to this invention a method of heat treating a workpiece undergoing a multi stage forming operation comprises introducing the workpiece into a heating zone, causing it to dwell in the zone for a period sufficient to heat it to a desired temperature, withdrawing it from the zone, immersing at least the heated part in coolant liquid, and moving the workpiece towards the next stage with the heated part remaining immersed in the liquid for a time sufficient to cool the heated part below the temperature at which significant oxidation can occur.

If desired, the liquid may extend into the next work stage and beyond.

The liquid may be provided by a static bath or by a liquid curtain established in such manner as to protect the workpiece against contact with the ambient atmosphere until the temperature has fallen below a level at which significant oxidation can occur.

The invention has particular application to the manufacture of small substantially cylindrical bulbs or capsules intended to be charged with carbon dioxide for use in aerating water in soda water syphons.

Mild steel strip is fed to a blanking stage of a multi-stage deep drawing press, where discs about 2.75 inches in diameter are stamped out. The discs are then subjected to a succession of drawing operations, usually nine, whereby the disc is shaped into an elongated hollow cylinder closed at one end. The machine is so designed that each stage of drawing takes about one second. That is to say, the initial blanking and the nine successive drawing operations are completed in about ten seconds.

The metal in the region of the open end has then to be drawn down to form a neck. As a result of work hardening, the part which has to form the neck is too hard to be drawn down without risk of distorting the cylinder. It is accordingly necessary to subject the metal in the region of the open end to localised annealing before proceeding with the final neck drawing stage or stages.

To achieve annealing the metal must be raised to a temperature of about 800° C. If heated in air, the steel suffers undesirable oxidation. Moreover, within the total period of one second allowed for annealing, the part, after having been heated, will not have cooled sufficiently before it is transferred to the neck forming station.

For the reason previously given herein, attempts to accelerate cooling by conducting the annealing operation in a liquid coolant have not proved successful because of the tendency for an insulating layer of vaporised coolant to form around the heated part reducing the rate of heat transfer. In consequence, on being lifted out of the bath is coolant in transit to the neck forming station, the heated part is still at such a high temperature that atmospheric oxidation is liable to occur.

This difficulty is overcome in accordance with this invention, by establishing a continuum of the liquid coolant in the path of traverse from the heating station to the succeeding neck forming station, the continuum being of such extent as to deny access of atmospheric air to the annealed part before the temperature thereof has fallen to a level such that no significant oxidation can occur. It will be convenient in many cases for the workpiece to be transferred from the annealing station to the neck forming station with the annealed part continuously immersed in the liquid coolant or shielded by a curtain of the liquid.

An apparatus for carrying out the annealing of partially formed capsules will now be described by way of example with reference to the accompanying drawing which illustrates a side elevation, partly in section, of the apparatus.

Referring to the drawing the apparatus comprises a heating station 1, a neck forming station 2 and a capsule handling device 3 for locating the capsule in the different regions of the heating station 1 and subsequently transferring the capsule to the neck forming station 2.

The heating station 1 includes a hollow casing 4 having a base 5 and a top 6 which has an aperture 7 extending through its centre. A high frequency heating coil 8 is mounted on a support column 9 which extends upwardly from the base 5; the coil 8 and column 9 being coaxial with the aperture 7.

A rim 10 extends outwardly and upwardly from the top 6 to form the sides of a bath 11, and water is poured into the casing until it fills the inside of the casing 4 and the bath 11 so as to submerge the coil 8.

The handling device 3 consists essentially of a downwardly extending piston 12 reciprocally mounted in a cylinder 13 secured to a head 14 which can travel horizontally between the heating station 1 and the neck forming station 2. An attachment 15 is secured to the forward end of the cylinder 13, this attachment having a central bore 16 which conforms to the shape of the body portion of the capsule being formed.

In operation a partially formed capsule 17 is inverted and mounted on the forward end of the piston 12 by means of spring clips (not shown). The head 14 is held at the level shown and moved horizontally until the capsule is coaxially aligned with the heating coil 8.

The piston 12 is then fully advanced in the cylinder 13 to the position shown, the head 14 is lowered to locate the neck portion of the capsule 17 in the coil 8 and then the coil 8 is energised to heat the capsule. When the capsule has reached a temperature of about 800° C., the coil 8 is de-energised and the head 14 is raised to locate the heated portion of the capsule 17 in the bath 11 as shown.

The head 14 is then moved horizontally to the right, and at the same time the piston 12 is withdrawn along the cylinder 13 so that the open end of the capsule 17 describes the path through the bath 11 shown in dotted lines 18 before being withdrawn from the bath and transferred to the neck forming station 2. Consequently, the neck portion of the capsule remains submerged in the bath for a longer period than with previous methods when the capsule was withdrawn vertically from the bath. It has been found that by describing the path 18 the capsule can be cooled sufficiently to prevent oxidation and yet still pass through the heating station in the required period of one second.

I claim:

1. A high speed multi-stage forming operation with interstage heat annealing which includes the steps of immersing, by means adapted to immerse successive workpieces, at least part of a formed workpiece in coolant liquid, said immersion means being located externally of the liquid, heating said part while immersed until it reaches the annealing temperature, and moving the workpiece while still in the coolant liquid towards the next forming stage with the heated part remaining immersed in the liquid for a time sufficient to cool the heated part below the temperature at which significant oxidation can occur, said time for the complete operation not in excess of one second.

2. A high speed forming operation according to claim 1, in which the workpiece is transferred from the annealing station to a subsequent forming station through a bath of cooling liquid extending horizontally therebetween.

3. A high speed forming operation as claimed in claim 1, in which the workpiece is a blank which is formed from mild steel strip or sheet and which is progressively formed in multiple forming steps into a deep-drawn container.

4. A high speed forming operation according to claim 1, in which the workpiece is heated by a high-frequency heating coil.

References Cited

UNITED STATES PATENTS 2,029,037   1/1936   Scrantom _____ 148—150
2,363,741   11/1944  Montgomery _____ 148—154

RICHARD O. DEAN, Primary Examiner

U.S. Cl. X.R.

113—120 H; 148—154, 155